United States Patent [19]

Duh

[11] Patent Number: 4,475,100
[45] Date of Patent: Oct. 2, 1984

[54] SIDE MIRROR WITH INDICATOR LIGHT

[76] Inventor: Ching-Jeng Duh, 20, La. 205, Section 3, Chung Ching N. Rd., Taipei, Taiwan

[21] Appl. No.: 351,121

[22] Filed: Feb. 22, 1982

[51] Int. Cl.³ .............................................. B60Q 1/00
[52] U.S. Cl. ......................................... 340/98; 340/84; 340/87; 362/135; 362/140; 350/298; 350/307
[58] Field of Search ...................... 340/98, 84, 87, 119, 340/122, 123; 350/291, 298, 331 R, 309, 307, 278, 303; 362/296, 135, 61, 84, 140–144

[56] References Cited

U.S. PATENT DOCUMENTS 1,940,605  12/1933  Roberts ................................. 340/98

FOREIGN PATENT DOCUMENTS 207271   11/1923  United Kingdom .................. 340/98
1210061  10/1970  United Kingdom .................. 340/98

Primary Examiner—Donnie L. Crosland
Attorney, Agent, or Firm—Ross, Ross & Flavin

[57] ABSTRACT

A side rearview mirror of a vehicle is provided with an indicator light. A margin is provided with an indicator light to aid in driving safely.

1 Claim, 2 Drawing Figures

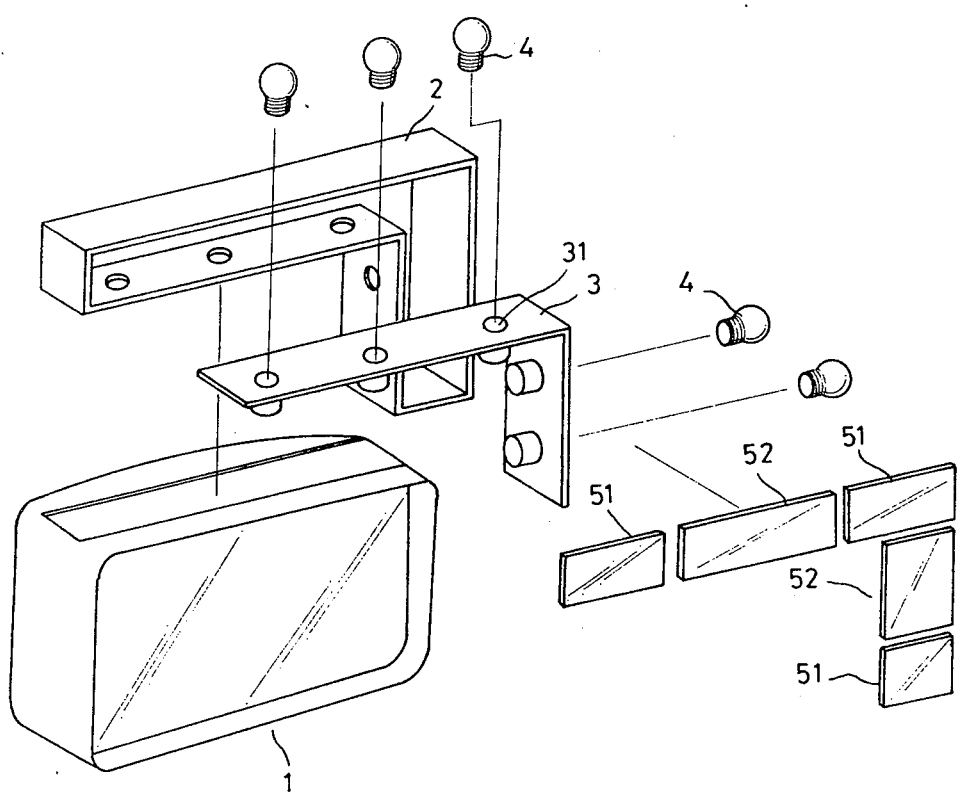
F I G.1

SIDE MIRROR WITH INDICATOR LIGHT

BACKGROUND OF THE INVENTION

This invention relates to the side mirror of a vehicle and more particularly, to a mirror which is provided on its margin with an indicator light which may be easily perceived by a pedestrian or a driver in an oncoming or following vehicle.

Conventional indicator means on a vehicle for serving notice to vehicles following behind or approaching in an opposite direction, when the driver is preparing to make a turn, are either positioned below the headlights or mounted at both sides of the vehicle. In the former case, the driver of the abreast running vehicle cannot perceive the indicator light. In the latter case, the indicator lights are not located in a very prominent position, especially in the case of a small vehicle having a low hull. In either case, they fail to give satisfactory results. Moreover, the driver himself often cannot see if his indicator light is operative. When the indicator light does not work, due for example to a poor contact of the bulb or the burnout of a filament, the inside indicator may yet remain bright so as to give the wrong signal to the operator.

Furthermore, in some cases, accidents may be caused by careless drivers who forget to turn out their indicator after having made a turn so that the other drivers are misguided by the wrong signal. Concentrating his attention on more critical things, an unskilled driver is liable to misuse the indicator light.

Accordingly, it is the chief object of this invention to provide an improved indicator light whereby the above-mentioned drawbacks are obviated and/or mitigated.

SUMMARY OF THE INVENTION

The invention relates to an indicator light which is marginally mounted on the side mirror of a vehicle. In so mounting, all the aforesaid problems are satisfactorily solved. Apart from a freedom from the foregoing disadvantages, a driver can judge the width of the opposite oncoming vehicle, thereby largely reducing the probability of collision or hull abrasion. With the indicator light at the side mirror, a driver can easily perceive an intent to turn on the part of the vehicle running abreast. Similarly, he can let the latter know his own plan for turning. Although he may not be able to see the right indicator light of the vehicle at his right side or the left indicator light of the vehicle at his left side, this would not be a matter of first importance because no collision would be likely to result from such turning. Furthermore, this invention enables the driver to observe if his indicator light works.

In the case of the conventional means, one cannot check if his indicator light is out of order without the aid of another person or without going outside his car to see for himself.

When two vehicles coming in opposite directions meet each other in the night, each driver, dazzled by the glaring headlight of the opposite vehicle, cannot assess the width of the approaching vehicle. He can only roughly estimate its width in order to dodge it. This obviously leads to a dangerous situation. For this reason, this invention provides a means which includes a set of red panels which give good reflective effect and a set of yellow panels which are highly pervious to light. The red panels enable the night drivers to judge the width of the opposite vehicles.

GENERAL DESCRIPTION

In the drawings:

FIG. 1 is an exploded isometric view of the invention; and

Figure 2:
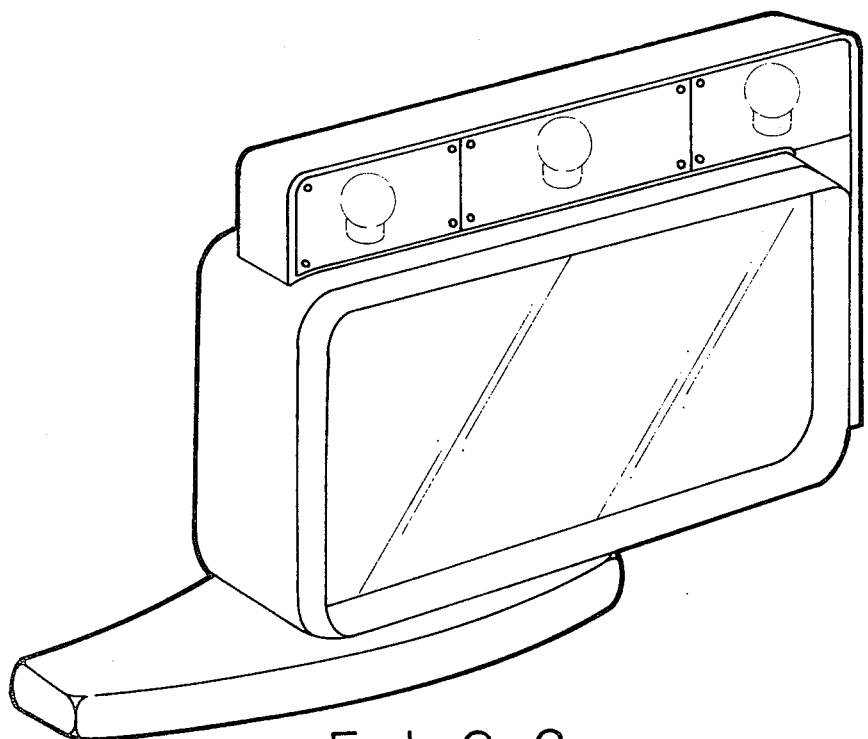
FIG. 2 is a perspective view of the invention.

With reference to FIG. 1, the invention comprises a side rearview mirror 1, which is marginally provided with an inverted L-shaped indicator light frame 2 within which is seated a bulb board 3 of like L-shape and provided with a plurality of, for example, five sockets 31 for receiving bulbs 4.

Frame 2, however, may be formed integrally with side mirror 1 so as to reduce the cost of the assemblage. Red plastic panels 51 and yellow plastic panels 52 are preferably alternately mounted with respect to the frame.

It will be apparent to those skilled in the art that various modifications of the present invention are possible. Accordingly, the scope of the present invention should be interpreted solely from the following claims.

I claim:

1. For a vehicle, a combination rearwardly facing mirror and indicator signal comprising:
    a framed rearview mirror adapted for attachment to the side of a vehicle and having a grooving in the top and on one side of the frame,
    an inverted L-shaped open-sided housing for accommodation in and securement to the grooving in the top and one side of the mirror frame and having a plurality of spaced bulb-receiving apertures,
    an inverted L-shaped bulb board seatable within the housing and having a plurality of spaced bulb-receiving apertures each alignable with a respective one of the bulb-receiving apertures of the housing,
    a plurality of bulbs engageable in the respective bulb-receiving apertures of the bulb board and housing,
    a plurality of alternately colored panels mounted for vertical disposition in one of the open sides of the housing and forwardly of the plurality of bulbs.

* * * * *